Dec. 18, 1923. Re. 15,733
P. KESTEN ET AL
AUTOMATIC BRAKE FOR ELEVATORS
Original Filed May 6, 1913
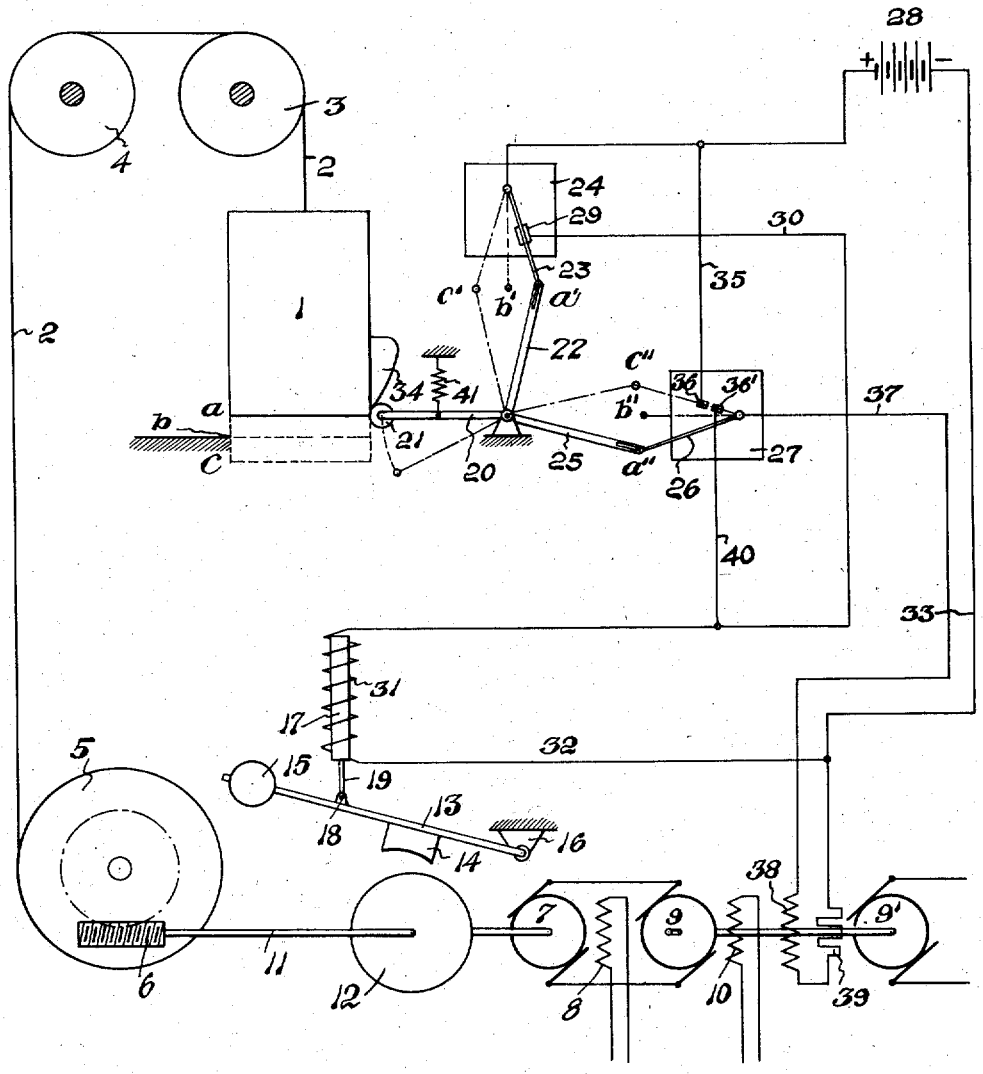
*Inventor:*
Paul Kesten and
Heinrich Osborne
by Walter C. Bradley
Attorney Reissued Dec. 18, 1923. Re. 15,733

UNITED STATES PATENT OFFICE.

PAUL KESTEN, OF HUCKELSHOFEN, NEAR AACHEN, AND HEINRICH OSBORNE, OF BERLIN-WILMERSDORF, GERMANY, ASSIGNORS, BY MESNE ASSIGNMENTS, TO OTIS ELEVATOR COMPANY, OF NEW YORK, N. Y., A CORPORATION OF NEW JERSEY.

AUTOMATIC BRAKE FOR ELEVATORS.

Original No. 1,173,438, dated February 29, 1916, Serial No. 765,839, filed May 6, 1913. Application for reissue filed September 29, 1923. Serial No. 665,664.

*To all whom it may concern:*

Be it known that we, PAUL KESTEN and HEINRICH OSBORNE, citizens, respectively, of Germany, and the Czechoslovakian Republic, and residing, respectively, at Huckelshofen near Aachen, and Berlin-Wilmersdorf, Germany, have invented certain new and useful Improvements in Automatic Brakes for Elevators, of which the following is a specification.

This invention relates to automatic brakes for electric elevators.

When elevators travel at high speeds and have to convey heavy loads it is difficult to stop at exactly predetermined points. In spite of quick-acting braking devices the highly loaded cage will always travel a considerable distance beyond the desired end position owing to its momentum when the disconnecting contact-piece for the motor and for the application of the brake is so arranged that the elevator stops when running empty in the desired position. Such elevators are therefore frequently caused to travel at a reduced speed before they reach the stopping place, so that the brake is applied for only a short distance both when the elevator is light and when it is fully loaded, whereby greater accuracy in reaching the correct stopping place is obtained. Even when this method is used it is not possible to reach the prescribed point absolutely exactly. According in each instance to the magnitude of the load on the elevator the cage remains stationary within a certain distance of the required position. On the other hand, the described arrangement has the considerable disadvantage that the average speed of travel is materially diminished by the high speed ceasing prematurely.

A primary object of this invention is to provide an automatic brake for elevators such that there is no need to reduce the speed before running to the stopping place. The cage is to be able to travel at full speed as far as every stopping place, so that all loss of time owing to premature slowing of the entire elevator is obviated. In the event of the cage running past a predetermined limit, say in consequence of its momentum when greatly loaded, the direction of rotation of the driving motor has to be reversed as rapidly as possible, so that the cage returns slowly and stops when arriving in its correct position. As the elevator always has only a low speed when traveling beyond this desired end position, only a minimum loss of time is connected with its traveling back into its correct position.

The reversal of the direction of rotation of the motor, which is preferably driven by a controlling generator connected on the Leonard system, is brought about by the field of this generator being reversed. For example, this generator may be provided with a separate field winding which is independent of the main windings and is traversed by the current only when the cage travels past the desired end position and then in an opposite direction to that in which the current has previously traversed the main windings. In order to bring the magnetic field as rapidly as possible to its final value, large resistances may be connected in series with this auxiliary winding, so that the time constant of the circuit is very small. It is to be understood, however, that any other method of rapid excitation may be employed if desired.

After the direction of rotation has been reversed and when the cage is traveling into its correct stopping position, in order to prevent the elevator-motor having to work against the action of the already applied brake, the brake-magnet which prevents the application of the brake is preferably energized by the current used for reversing the excitation of the controlling generator. When the motor runs in the opposite direction the brake is then taken off and applied again only in the desired end position of the lift.

The improved automatic brake for elevators according to our invention will now be described with reference to the accompanying drawing diagrammatically showing one form of apparatus according to the invention.

In the drawing, 1 designates the cage carried by the rope 2 which passes over the pulleys 3 and 4 to the drum 5 driven by means of the gearing 6 and the shaft 11 by the driving motor 7. This motor having the shunt winding 8 is controlled by the generator 9 having the main field winding 10, driven by another motor 9′. Fast on the shaft 11 is the brake-disk 12. The brake-lever 13 carrying the brake-block 14 and the weight 15 is fulcrumed in the bearing 16. The core of brake-magnet 17 is connected by the eye 18 and the rod 19 with the lever 13. The one lever-arm 20 of a three-armed lever 20, 22, 25 carries the antifriction or guide roller 21, the second arm 22 of this lever is pivotally connected with the handle 23 of an end switch 24, and the third arm 25 of this lever is pivotally connected with the handle 26 of a second end switch 27.

In the position *a* of the cage shown in the drawing, i. e., shortly before the cage moves into the desired position *b*, when it is still moving at the full working speed, the following circuit is closed:—plus terminal of a source of current 28, switch 24 and its contact plate 29, conductor 30, solenoid 31 of the brake-magnet 17, the conductors 32, 33, and the minus terminal of the source of current 28. The magnet 17 is consequently drawn into the solenoid 31 and the brake-block 14 is removed from the brake-disk 12.

In the desired position *b* of the cage the roller 21 has run onto the stop 34 mounted on the cage, so that the lever-arm 22 and the handle 23 are moved into the position *b'* and the lever-arm 25 and the handle 26 into the position *b''*. The above-mentioned circuit is consequently broken and the brake is applied. When the cage 1 travels past the desired position *b* the roller 21 runs farther up the stop 34. In the position *c* of the cage the lever-arm 22 and the handle 23 are moved from the position *b'* to *c'* and the third lever-arm 25 and the handle 26 are moved from the position *b''* to *c''*. In this position the following circuit is closed by the switch 27:—the source of current 28, conductor 35, contact-plate 36 and switch 27, wire 37, the second shunt winding 38 of the generator 9, resistance 39, the wire 33 and the source of current 28. The auxiliary winding 38 when energized will cause the reversal of the generator 9. The solenoid 31 of the magnet 17 is connected in parallel therewith over the contact-plate 36, the handle 26 of the switch 27, the contact-plate 36', and the wires 40 and 32, so that the brake-block 14 is simultaneously removed from the disk 12. The motor 7 then changes its direction of rotation and lifts the cage 1 back into the desired position *b*, the three-armed lever 20, 22, 25 being likewise moved backward by the spring 41. The lever-arm 22 and the handle 23, and the lever-arm 25 and the handle 26 thus return into the positions *b'* and *b''*, respectively, so that no current flows in the solenoid 31 or in the auxiliary field-winding 38 of the generator 9. The brake is again applied and the cage stops in the desired position *b*. When the disconnecting stop 34 returns, the three-armed lever 20, 22, 25 is returned by the spring 41 into its initial position so that the handles 23, 26 of the switches 24 and 27, respectively, are returned into their initial positions *a'* and *a''*, respectively, the brake being again released by the switch 24 as described above and the cage 1 being able to be moved forward or backward in known manner again.

Obviously the herein described apparatus can be used for any desired number of stopping places of the elevator and also for both directions of travel.

We claim:

1. The combination with a controlling generator, and a motor driven thereby on the Leonard system, of an auxiliary field-winding on said generator for reversing the field thereof, a cage of an elevator and means controlled by said cage for energizing said field-winding when the cage has passed a predetermined point and deenergizing the same when the cage has returned to said point.

2. The combination with a controlling generator, a motor driven thereby on the Leonard system and an electromagnetic brake for the motor, of a normally closed circuit including the winding of said electromagnetic brake, a normally open second circuit including an auxiliary field-winding on said generator for reversing the field thereof, a cage of an elevator and means controlled by said cage for first opening the first circuit when the cage passes a predetermined point, then closing both this circuit and the second circuit when the cage has run beyond this point, and finally reopening both circuits when the cage has returned thereto.

3. The combination with a controlling generator, a motor driven thereby on the Leonard system and an electromagnetic brake for the motor, of a normally closed circuit including the winding of said electromagnetic brake, a normally open second circuit in parallel with said winding and including an auxiliary field-winding on said generator for reversing the field thereof; a cage of an elevator and means controlled by said cage for first opening the first circuit when the cage passes a predetermined point, then closing both this circuit and the second circuit when the cage has run beyond this point, and finally reopening both of said circuits when the cage has returned thereto.

4. The combination with a controlling generator, and a motor driven thereby on the Leonard system, of an auxiliary field-winding on said generator for reversing the field thereof, a resistance in series with said field-winding, a cage of an elevator and means controlled by said cage for energizing said field-winding and resistance when the cage has passed a predetermined point and deenergizing the same when the cage has returned to said point.

5. The combination with a controlling generator, and a motor driven thereby, of a cage of an elevator and electric means controlled by the cage for reversing the motor when the cage has passed a predetermined point and automatic means for stopping the cage when it has returned to said point.

6. The combination with a controlling generator, and a motor driven thereby on the Leonard system, of a cage of an elevator and electric means controlled by the cage for reversing the motor when the cage has passed a predetermined point and automatic means for stopping the cage when it has returned to said point.

7. The combination with a controlling generator, a motor driven thereby on the Leonard system, the cage of an elevator, and means controlled by said cage for reversing the field of the controlling generator when the cage has passed a predetermined point and for automatically de-energizing the field of said controlling generator when the cage has returned to said point.

8. The combination with a controlling generator, and a motor driven thereby on the Leonard system, of a cage of an elevator and electric means controlled by the cage for reversing the motor when the cage has passed a predetermined point and automatic means including an electromagnetic brake for stopping the cage when it has returned to said point.

In testimony whereof, we have signed our names to this specification, this 25th day of August 1923.

PAUL KESTEN.
HEINRICH OSBORNE.